(12) United States Patent
Varney et al.

(10) Patent No.: US 7,900,461 B2
(45) Date of Patent: Mar. 8, 2011

(54) COMBUSTOR LINER SUPPORT AND SEAL ASSEMBLY

(75) Inventors: Bruce Edward Varney, Greenwood, IN (US); Vickie Rae Smiley, Indianapolis, IN (US); Todd S. Taylor, Whiteland, IN (US); Jack Dwane Petty, Sr., Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 950 days.

(21) Appl. No.: 11/755,793

(22) Filed: May 31, 2007

(65) Prior Publication Data

US 2010/0011780 A1 Jan. 21, 2010

(51) Int. Cl.
*F02C 7/20* (2006.01)
(52) U.S. Cl. ............................................. 60/800; 60/752
(58) Field of Classification Search ..................... 60/722, 60/752, 796, 798, 800, 804
See application file for complete search history.

(56) References Cited

U.S. PATENT DOCUMENTS

| | | | |
|---|---|---|---|
| 5,289,677 A | * | 3/1994 | Jarrel .............................. 60/796 |
| 5,848,874 A | * | 12/1998 | Heumann et al. ............. 415/189 |
| 6,347,508 B1 | | 2/2002 | Smallwood et al. |
| 6,666,460 B2 | | 12/2003 | Diana |
| 6,854,738 B2 | | 2/2005 | Matsuda et al. |
| 7,025,563 B2 | | 4/2006 | Servadio et al. |
| 7,040,098 B2 | | 5/2006 | Lepretre et al. |
| 2004/0154303 A1 | | 8/2004 | Mitchell et al. |
| 2005/0073114 A1 | | 4/2005 | Amos et al. |

* cited by examiner

*Primary Examiner* — Louis Casaregola
(74) *Attorney, Agent, or Firm* — Ray Meiers; Meiers Law Office LLC

(57) ABSTRACT

The invention is a combination that includes a gas turbine engine extending along an axis. The gas turbine engine includes an annular combustor with a combustor liner. The combination of the invention also includes a plurality of projections extending from the combustor liner and spaced from one another circumferentially about the axis. The combination of the invention also includes a free-standing ring disposed about the combustor liner and positioned adjacent to the plurality of projections along the axis. The plurality of projections engage a corresponding circumferentially-facing portion of the free-standing ring and circumferentially support the combustor liner while allowing relative radial displacement between the combustor liner and the free-standing ring. The combination of the invention also includes a rolling assembly operably disposed between the free-standing ring and the plurality of projections to reduce binding during the relative radial displacement.

20 Claims, 4 Drawing Sheets

COMBUSTOR LINER SUPPORT AND SEAL ASSEMBLY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of N00019-04-C-0093 awarded by the Department of Defense.

BACKGROUND OF THE INVENTION

1. Field of the Invention

The present invention relates generally to gas turbine engines. More particularly, the present invention relates to a structure for supporting a combustor liner in a gas turbine engine.

2. Description of Related Prior Art

U.S. Pat. No. 6,347,508 sets forth a combustor liner support and seal assembly. Applying the reference numerals used in the '508 patent, an outer combustor liner 28b is supported at its aft end 71 with an inner mounting ring 60 having a plurality of projections or lugs 74. An outer ring 62 includes first and second flanges 92, 94 disposed on opposite sides of the lugs 74. Pins 100 are welded in apertures 104 defined in the flange 94 and extend into slots 76 defined in the lugs 74. The cooperation between the pins 100 and the slots 76 allows the ring 62 and the lugs 74 to move radially with respect to another. Relative radial movement can be desirable because different thermal coefficients of expansion between the combustor liner 28b/mounting ring 60 and the outer ring 62 can lead to undesirable higher thermal gradients and stresses within the liner if the two parts are fixed to one another.

SUMMARY OF THE INVENTION

The invention is a combination that includes a gas turbine engine extending along an axis. The gas turbine engine includes an annular combustor with a combustor liner. The combination of the invention also includes a plurality of projections extending from the combustor liner and spaced from one another circumferentially about the axis. The combination of the invention also includes a free-standing ring disposed about the combustor liner and positioned adjacent to the plurality of projections along the axis. The plurality of projections engage a corresponding circumferentially-facing portion of the free-standing ring and circumferentially support the combustor liner while allowing relative radial displacement between the combustor liner and the free-standing ring. The combination of the invention also includes a rolling assembly operably disposed between the free-standing ring and the plurality of projections to reduce binding during the relative radial displacement.

BRIEF DESCRIPTION OF THE DRAWINGS

Advantages of the present invention will be readily appreciated as the same becomes better understood by reference to the detailed description below when considered in connection with the accompanying drawings, wherein.

DETAILED DESCRIPTION OF THE EXEMPLARY EMBODIMENT

The present invention sets forth several improvements to the combustor liner support and seal assembly set forth in U.S. Pat. No. 6,347,508. Therefore, the '508 patent is hereby incorporated by reference in its entirety.

Figure 1:
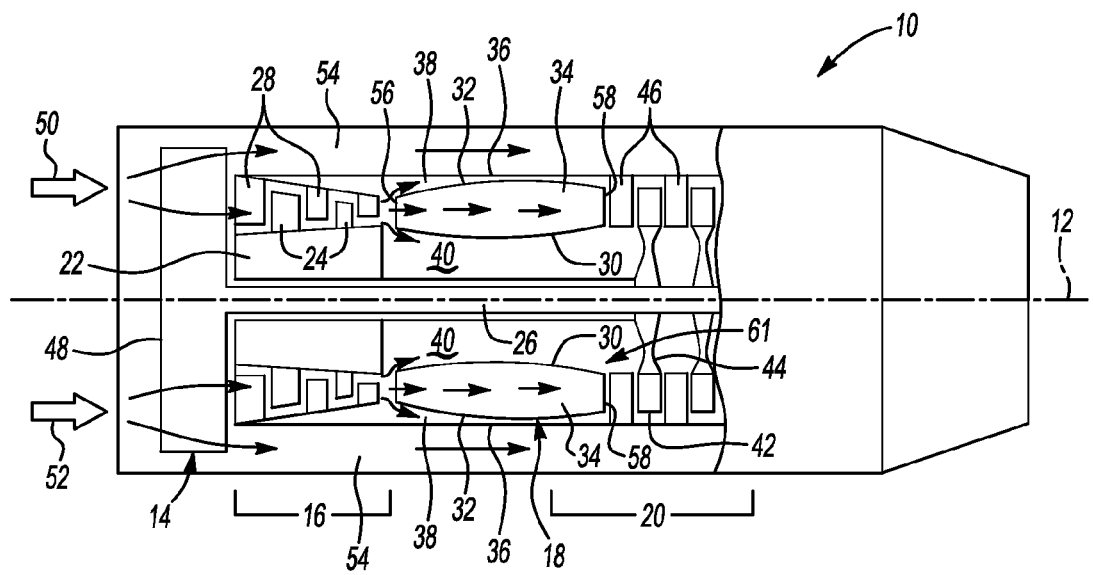
FIG. 1 is a simplified schematic view of a gas turbine engine according to the exemplary embodiment of the invention.

FIG. 1 is a schematic representation of a gas turbine engine 10. The gas turbine engine 10 extends along a longitudinal axis 12. As used herein, forms of the terms "radial" and "circumference" as applied to some structure refer to the relationship between the structure and the axis 12. The gas turbine engine 10 has a generally annular configuration, however other configurations can be practiced in alternative embodiments of the present invention. The exemplary gas turbine engine 10 includes a fan section 14, a compressor section 16, a combustor section 18, and a turbine section 20 that are integrated to produce an aircraft flight propulsion engine. This particular type of gas turbine engine is generally referred to as a turbo-fan. An alternate form of a gas turbine engine that can be practiced with the invention includes a compressor, a combustor, and a turbine integrated to produce an aircraft flight propulsion engine without a fan section. It should be understood that the term aircraft is generic, including without limitation helicopters, airplanes, missiles, space devices and other substantially similar devices. It is also noted that numerous configurations of turbine engines can practiced with the invention. For example, multiple compressor and turbine sections can be incorporated, with intercoolers connected between the compressor stages. Also, reheat combustion chambers can be added between the turbine stages. All of the various configurations of gas turbine engines described above and/or known in the art can be practiced with the invention. It is also noted that the present invention can be practiced in operating environments other than aircraft propulsion, such as industrial applications including but not limited to pumping sets for gas and oil transmission lines, electricity generation, and naval propulsion.

The compressor section 16 includes a rotor 22 having a plurality of compressor blades 24. The rotor 22 is fixed to a rotatable shaft 26. A plurality of compressor vanes 28 are positioned adjacent to the compressor blades 24 to direct the flow of air through compressor section 16. The combustor section 18 includes an inner combustor liner 30 and an outer combustor liner 32. The liners 30, 32 cooperate with one another to define the inner and outer boundaries of an annular combustion chamber 34. The outer combustor liner 32 is concentrically mounted relative to an outer casing or housing 36 to define an annular fluid passage 38 that surrounds the chamber 34. Also, the inner combustor liner 30 is concentrically mounted relative to the shaft 26 to define an annular fluid passage 40 surrounded by the chamber 34. Fuel is introduced into combustion chamber 34 via a plurality of fuel nozzles (not shown). The inner and outer liners 30, 32 are each formed of materials that are capable of withstanding high temperature environments. Materials such as metallic superalloys and inter-metallic materials, and structures such as Lamilloy®, are contemplated as being within the scope of embodiments of the invention.

The turbine section 20 includes a plurality of turbine blades 42, each coupled to a rotor disk 44. The rotor disk 44 is fixed to the shaft 26. A plurality of turbine vanes 46 are positioned adjacent to the turbine blades 42 to direct the flow of the hot gaseous fluid stream through the turbine section 20. A turbine nozzle 61, sometimes referred to as inlet guide vanes 46, is positioned downstream of the combustor section 18 to direct the hot gaseous fluid stream exiting the combustion chamber 34 toward the turbine blades 42. In the exemplary embodiment of the invention, the gaseous fluid comprises combustion gases.

In operation, the turbine section 20 provides rotational power to one or more shafts 26 to drive the fan section 14 and the compressor section 16, respectively. The fan section 14 includes a fan 48. Air enters the gas turbine engine 10 in the direction indicated by arrows 50, 52 and passes through the fan section 14. The air stream is then divided and fed into both the compressor section 16 and a bypass duct 54. The compressed air exiting compressor section 16 is routed into both the combustion chamber 34 and also the annular fluid passages 38, 40. The compressed air enters the combustion chamber 34 at a forward end 56 of the combustor section 18 and is intermixed with fuel, to becoming a combustible air/fuel mixture. The air/fuel mixture is ignited and burned in the combustor section 18, generating a hot gaseous fluid stream. The hot gaseous fluid stream exits an aft end 58 of the combustor section 18 and is fed into the turbine section 20 to provide the energy applied to power the gas turbine engine 10. During normal operation of the gas turbine engine 10, the air flowing through passages 38, 40 is at a higher pressure than the hot gaseous air stream flowing through combustion chamber 34 and is also at a lower temperature.

Two operational considerations relating to the turbine nozzle flow from the arrangement described above. First, the combustor liners 30, 32 move relative to the turbine section 20 and nozzle 61 and it is thus desirable to seal fluid passageways 38, 40 from the turbine blades 42 and turbine vanes 46. Second, the pressure differential between the fluid streams moving around the outside of the combustion chamber 34 in the passage 38 and the hot gaseous fluid stream moving inside the combustion chamber 34 results in a buckling load on the combustor liner 32 and it is therefore desirable to support the floating ends of the combustor liner 32 against inward deflection.

Figure 2:
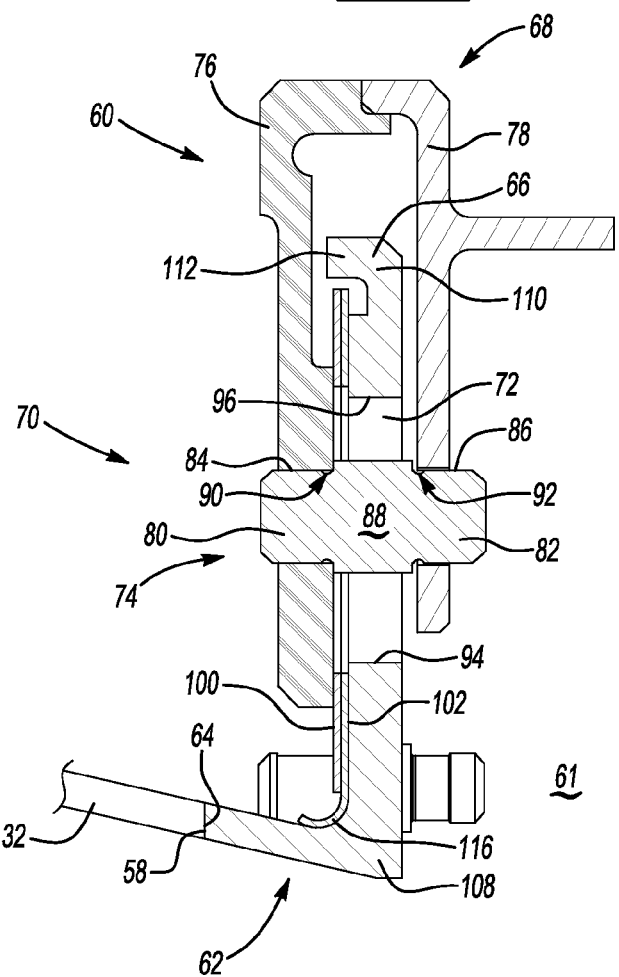
FIG. 2 is a cross-sectional view of a rolling assembly according to the exemplary embodiment of the invention.
Figure 3:
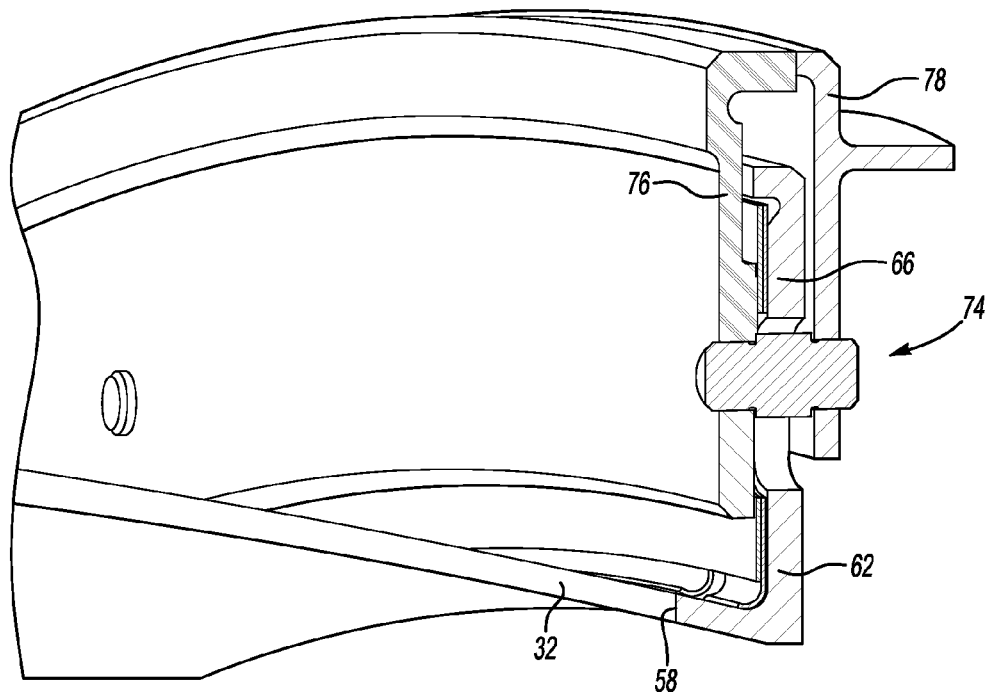
FIG. 3 is the cross-sectional view of FIG. 2 shown in perspective view.

Referring now to FIGS. 2 and 3, a combustor liner support and seal assembly 60 is positioned between the aft end 58 of the combustor liner 32 and the turbine nozzle 61. The aft end 58 of liner 32 is spaced apart from the turbine nozzle, defining a passageway. The assembly 60 closes and seals this passageway while allowing the aft end 58 to expand and contract radially. The assembly 60 also supports the liner 32 and helps prevent buckling. The assembly 60 includes an inner mounting ring 62 with a forward end 64 fixed to the aft end 58 of the combustor liner 32 about the entire periphery of the outer combustor liner 32. A plurality of projections 66 extend from the combustor liner 32 by way of the mounting ring 62. The projections 66 are spaced from one another circumferentially about the axis 12. The assembly 60 also includes a free-standing ring 68 disposed about the combustor liner 32 and positioned adjacent to the plurality of projection 66 along the axis 12. The free-standing ring 68 floats relative to the combustor liner 32 in a plane normal to the axis 12. The plurality of projections 66 engage a corresponding circumferentially-facing portion of the free-standing ring 68 and circumferentially support the combustor liner 32 while allowing relative radial displacement between said combustor liner 32 and said free-standing ring 68.

The exemplary combustor liner 32 is formed of a metallic material and has a thermal mass less than the thermal mass of the ring 68. Also, the combustor liner 32 has a coefficient of thermal expansion that is equal to the coefficient of thermal expansion of the ring 68 and the ring 68 has a higher moment of inertia than the liner 32 and inner mounting ring 60. As a result, during operation the combustion liner 32 and the ring 62 will radially expand and contract together in response to the thermal cycle operation of the gas turbine engine 10 and the ring 68 will radially expand and contract at a slower rate. To compensate for this variation in radial expansion and contraction, relative radial displacement between the ring 62 and the ring 68 is permitted. The radial movement of the ring 60 and the liner 32 reduces undesirable hoop stresses from developing within the liner 32 which might otherwise result in low cycle fatigue (LCF) and the eventual failure of the liner 32.

The exemplary embodiment of the invention includes a rolling assembly 70 operably disposed between the free-standing ring 68 and the plurality of projections 66 to reduce binding during the relative radial displacement. In operation of the exemplary embodiment, for example, the pins 74 are substantially fixed against movement along the axis 12 by the ring 68 but are disposed to rotate relative to the ring 68. When the ring 68 and projections 66 move radially relative to one another, the pins 74 can roll along the side surfaces of the slots 72. The pins 74 may rotate one or more full turns during relative radial movement between the ring 68 and projections 66, or may rotate less than a full turn. The pins 74 may rotate back and forth during operation, or pivot, over only a portion of the slot 72 or may rotate along the entire length of the slot 72.

In the exemplary embodiment of the invention, the rolling assembly 70 includes a plurality of slots 72 and a plurality of pins 74. The plurality of slots 72 are defined in one of the free-standing ring 68 and the plurality of projections 66. In the exemplary embodiment, the slots 72 extend in the projections 66. In alternative embodiments of the invention, the slots 72 can extend in the ring 68. In such embodiments, the pins 74 would move radially relative to the ring 68. The slots 72 extend in a radial direction with respect to the axis 12. The plurality of pins 74 are each rotatably engaged with at least one of the free-standing ring 68 and the plurality of projections 66 and received in one of the plurality of slots 72 to thereby engage the combustor liner 32, through the mounting ring 62, and the free-standing ring 68 together for the relative radial displacement.

Any particular pin 74 could move in one of the slots 72 without contacting the surfaces that define the slot 72. This event is not likely, but could occur and is contemplated as an embodiment of the invention. Even in such a situation, the pin 74 would still be operable to rotate within the slot 72 even if rotation does not in fact occur.

In the exemplary embodiment of the invention, the pins 74 are rotatably engaged with both the projections 66 and the ring 68. The exemplary ring 68 includes a first radially-extending flange 76 disposed on a first side of the plurality of projections 66 along the axis 12 and a second radially-extending flange 78 disposed on a second side of the plurality of projections 66 along the axis 12 opposite the first side. Each of the plurality of pins 74 includes a first end 80 rotatably engaged with the first radially-extending flange 76 and a second end 82 rotatably engaged with the second radially-extending flange 78. The end 80 is received in an aperture 84 defined in the flange 76. The end 80 and aperture 84 are sized such that a close-tolerance, loose-fit is defined between the end 80 and the aperture 84. The end 82 is received in an aperture 86 defined in the flange 78. The cooperative relationship between the end 82 and the aperture 86 is the same as the cooperative relationship between the end 80 and the aperture 84. Thus, during relative radial movement between the liner 32 and the ring 68, the ends 80, 82 can substantially freely rotate within the apertures 84, 86, respectively.

The pins 74 also include a center portion 88 between the first and second ends 80, 82. The center portion 88 is rotatably disposed in one of the plurality of slots 72. Thus, during relative radial movement between the liner 32 and the ring 68, the center portion 88 can substantially freely rotate within the slot 72. The slots 72 define a width extending circumferentially with respect to the axis 12. The pins 74 are sized relative to the width of the slots 72 to substantially prevent circumferential movement between the plurality of projections 66 and the free-standing ring 68.

In the exemplary embodiment of the invention, the center portion 88 of at least some of the plurality of pins 74 have a greater diameter than the first and second ends 80, 82 such that a first shoulder 90 is defined between the center portion 88 and the first end 80 and a second shoulder 92 is defined between the center portion 88 and the second end 82. The first and second shoulders 90, 92 ensure that a minimum distance is maintained between the first and second radially-extending flanges 76, 78 to prevent binding between the flanges 76, 78 and the projections 66.

The exemplary embodiment of the invention also includes a limiting structure operably disposed between the free-standing ring 68 and the plurality of projections 66 to limit the relative radial displacement. The slots 72 extend radially-outward from a first closed end 94 to a second closed end 96 spaced radially outward of the first closed end 94. The pins 74 are limited in movement by the first and second ends 94, 96 of the slot 72, thereby limiting the relative radial displacement between the liner 32 and the ring 68. Limiting radial relative movement through the closed slots 72 ensures that the pins 74 will not pass out of the slots 72 and also prevents deformation of the liner 32 and ring 62, caused by a thermal growth differential, beyond a range deemed acceptable. The length of slot 72 between the closed ends 94, 96 can be selected so that the outer closed end 96 is not engaged by a pin 74 during expected thermal growth so as not to reduce low-cycle fatigue life. The liner 32 could buckle if a predetermined amount of expansion is prevented. The length of the slot 72 defines the predetermined amount of design travel.

Figure 6:
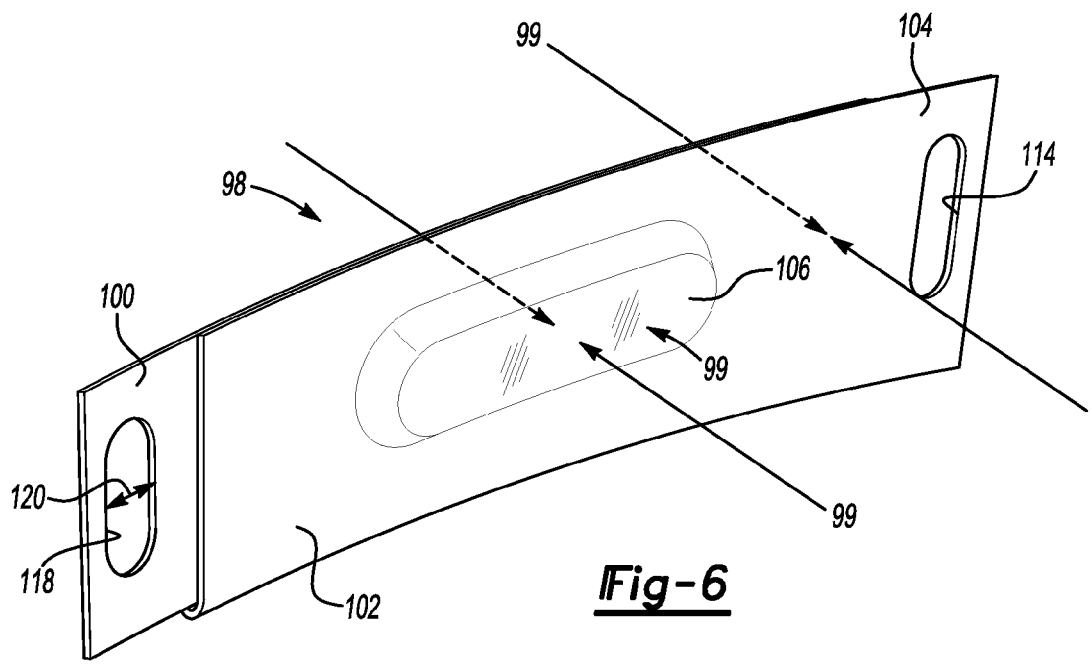
FIG. 6 is a perspective view of a portion of an annular seal according to the exemplary embodiment of the invention.
Figure 7:
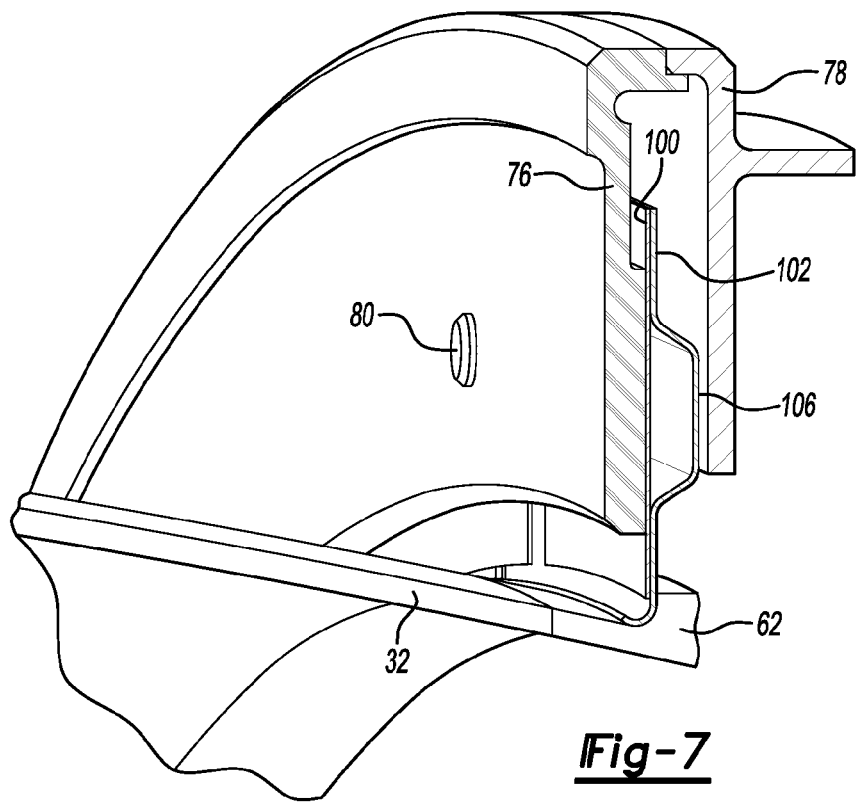
FIG. 7 is a perspective view of a cross-section through the combustor liner support and seal assembly.
Figure 8:
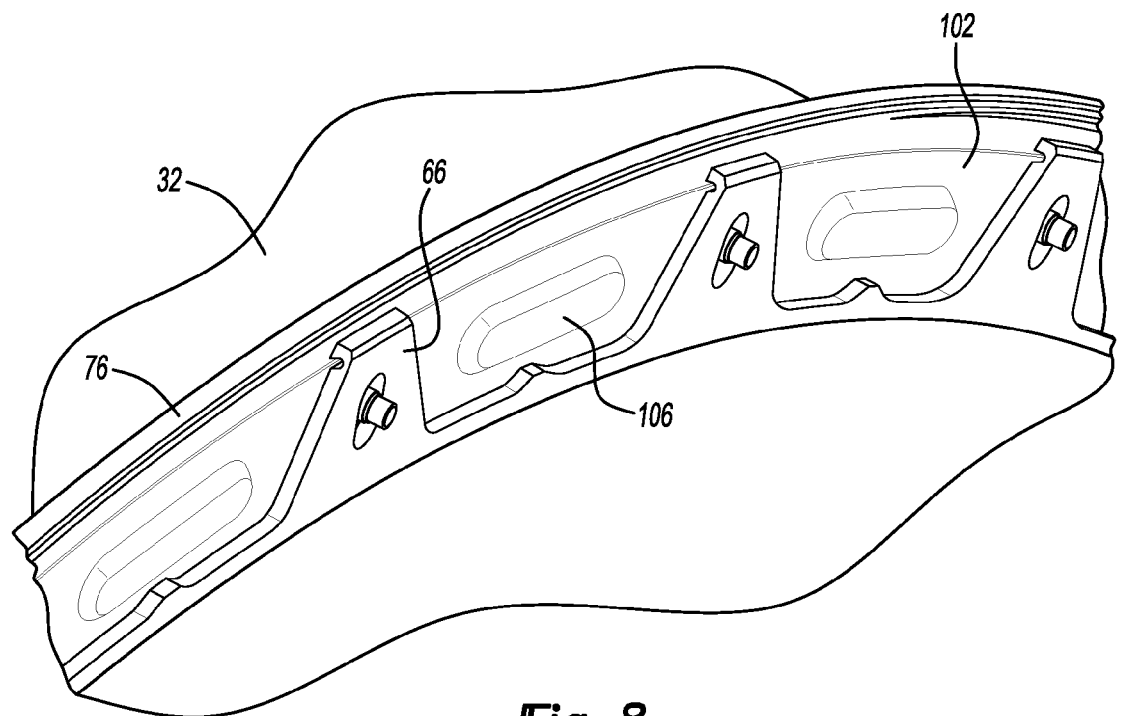
FIG. 8 is a perspective view looking forward of the plurality of projections and a portion a free-standing ring.

Referring now to FIGS. 6-8, the exemplary embodiment of the invention also includes a self-supporting annular seal 98 disposed between the free-standing ring 68 and the plurality of projections 66. The annular seal 98 has a variable thickness 99 about the axis 12. The thickness 99 is defined along the axis 12. Relatively wider portions of the annular seal 98 are disposed between adjacent projections 66 about the axis 12. Relatively narrower portions of the annular seal 98 are aligned with the plurality of projections 66 about the axis 12.

The exemplary seal 98 includes a first panel 100 and second panel 102 that are segmented about the axis 12. FIG. 6 shows one of the first panels 100 and one of the second panels 102. The seal 98 includes a plurality of the panels 100 that are placed in adjoining, side-by-side relationship to one another to define a substantially continuous sealing surface extending circumferentially around the axis 12. Also, the seal 98 includes a plurality of the panels 102 that are placed in adjoining, side-by-side relationship to one another to define a substantially continuous supporting ring extending circumferentially around the axis 12. The plurality of panels 100 are disposed back-to-back with the plurality of second panels 102.

Each of the panels 100 extends between two adjacent projections 66 to seal the space between the projections 66. Since the pressure of the fluid stream moving through the passageway 38 is greater than the pressure of the fluid stream moving out of the combustion chamber 34, each panel 100 is subjected to pressure tending to push the panel 100 toward the flange 78. This pressure would tend to cause the panel 100 to buckle between the projections 66 and create a leak path. The panels 102 provide support to the panels 100 to prevent this buckling.

Each of the panels 102 includes a flat portion 104 and a protrusion 106 extending from the flat portion 104 through the space between the projections 66. The protrusions 106 define the wider portions of the annular seal 98 about the axis 12, thus resulting in the exemplary seal 98 having a variable width. The first panel 100 contacts the first radially-extending flange 76 and the protrusion 106 extends through the space between two adjacent projections 66 to contact the second radially-extending flange 78 and thereby support the first panel 100 against buckling.

Referring again to FIGS. 2 and 3, each of the panels 100, 102 are maintained to cover the space between adjacent projections 66. However, the panels 100, 102 can move with the projections 66 in response to expansion and contraction resulting from temperature changes. Each of the plurality of projections 66 extends from a base 108 adjacent to the combustor liner 32. As the liner 32 expands, the projections 66 move radially outward. Thus, the projections 66 move circumferentially apart from one another as the liner 32 expands.

Figure 5:
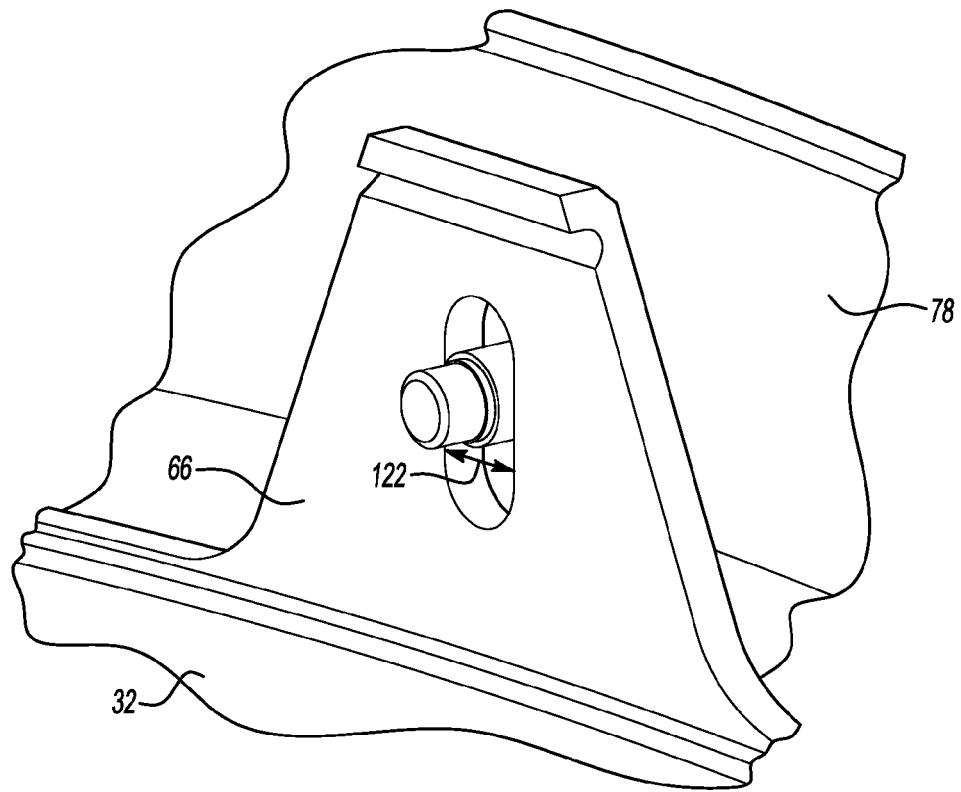
FIG. 5 is a close-up of a portion of the perspective view of FIG. 4.

The panels 100, 102 move with the projections 66 during expansion of the liner 32. Referring to FIGS. 2, 5 and 6, the first panel 100 includes an aperture 118 aligned with one of the slots 72 and defining a circumferential width 120. One of the pins 74 is received in the aperture 118. Each panel 100 can move with the pin 74 that is received in its aperture 118. When the liner 32 expands, the panels 100, which are disposed in adjoining, side-by-side relationship to one another, can circumferentially separate from one another.

Each of the second panels 102 includes an aperture 114 aligned with one of the slots 72. One of the pins 74 extends through the aperture 114 and prevents relative circumferential displacement between the second panel 102 and the plurality of projections 66. When the liner 32 expands, the panels 102, which are disposed in adjoining, side-by-side relationship to one another, can circumferentially separate from one another.

Figure 4:
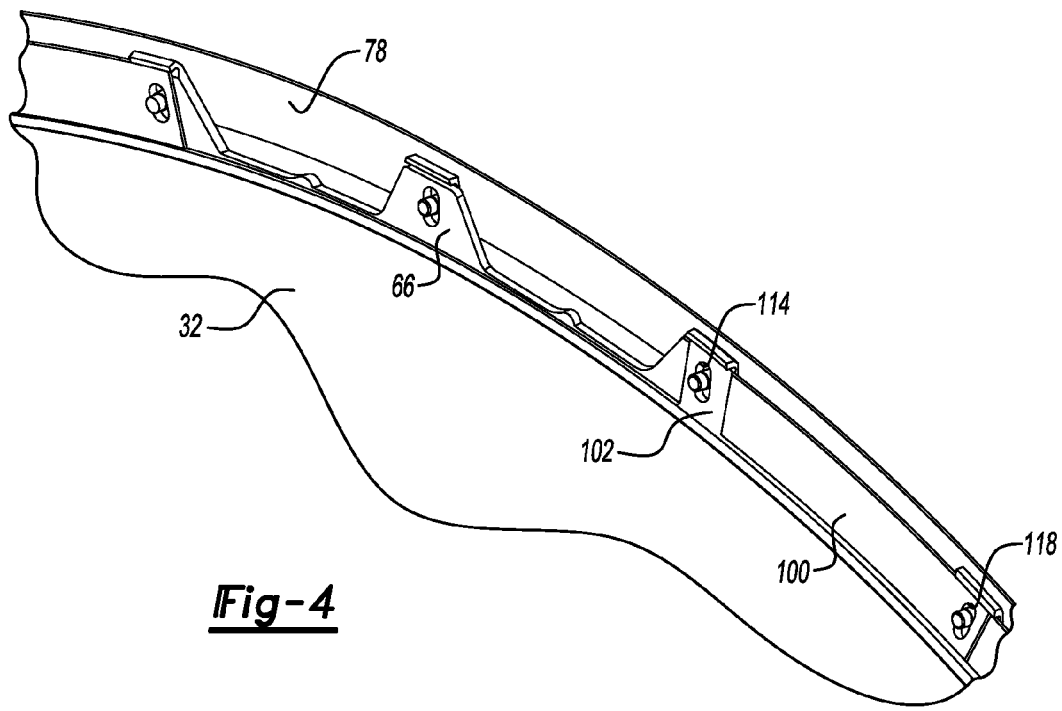
FIG. 4 is a perspective view looking aft of a plurality of projections according to the exemplary embodiment of the invention and a portion of a free-standing ring according to the exemplary embodiment of the invention.

As best shown in FIG. 4, the first and second panels 100, 102 can be staggered to enhance sealing. The aperture 118 of a first panel 100 can be aligned with a first one of the slots 72 and the aperture 114 of the immediately adjacent second panel 102 can be aligned with a second one of the slots 72 different than the first one. When the liner 32 expands, a panel 100 and a panel 102 disposed back-to-back can move relative to one another, sliding circumferentially away from one another. The back-to-back panels 100 and 102 do not slide fully apart and the gap between adjacent projections 66 remains closed.

Each of the plurality of projections 66 extends from the base 108 to a distal end 110 and includes a flange 112 projecting from the distal end 110. The flange 112 extends parallel to the axis 12 and substantially prevents radial movement of the panels 100, 102 outward relative to the projection 66. The panels 100, 102 define heights in the radial direction that are substantially equal to a distance between the base 108 and the flange 112. The second panels 102 include a lip 116 received at the base 108. The lip 116 receives a radially-innermost edge of the first panel 100. The first panel 100 defines a height in the radial direction that is substantially equal to a distance between the lip 116 and the flange 112 to maintain the first panel 100 in a fixed radial position relative to the projections 66.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A combination, comprising:
   a gas turbine engine extending along an axis and including an annular combustor having a combustor liner;
   a plurality of projections extending from said combustor liner and spaced from one another circumferentially about said axis;
   a free-standing ring disposed about said combustor liner and positioned adjacent to said plurality of projections along said axis;
   wherein said plurality of projections engage a corresponding circumferentially-facing portion of said free-standing ring and circumferentially support said combustor liner while allowing relative radial displacement between said combustor liner and said free-standing ring; and
   a rolling assembly operably disposed to roll between said free-standing ring and said plurality of projections during said relative radial displacement to reduce binding.

2. The combination of claim 1 wherein said rolling assembly further comprises:
   a plurality of slots defined in one of said free-standing ring and said plurality of projections and extending in a substantially radial direction with respect to said axis; and
   a plurality of pins each being rotatably engaged with the other of said free-standing ring and said plurality of projections and each being received in one of said plurality of slots to thereby engage said combustor liner and said free-standing ring together for said relative radial displacement and concurrently reduce binding.

3. The combination of claim 2 wherein said plurality of pins are further defined as being rotatably engaged with both of said free-standing ring and said plurality of projections.

4. The combination of claim 2 each of said plurality of slots defines a width extending circumferentially about said axis and wherein each of said pins is sized relative to said width to substantially prevent relative movement in the circumferential direction between said plurality of projections and said free-standing ring.

5. The combination of claim 2 wherein each of said plurality of slots extends between first and second closed ends to limit said relative radial displacement.

6. The combination of claim 2 wherein said free-standing ring further comprises:
   a first radially-extending flange disposed on a first side of said plurality of projections along said axis; and
   a second radially-extending flange disposed on a second side of said plurality of projections along said axis opposite said first side, wherein each of said plurality of pins includes a first end rotatably engaged with said first radially-extending flange and a second end rotatably engaged with said second radially-extending flange and a center portion between said first and second ends and rotatably disposed in one of said plurality of slots.

7. The combination of claim 6 wherein said center portion of each of said plurality of pins has a larger diameter than said first and second ends such that a first shoulder is defined between said center portion and said first end and a second shoulder is defined between said center portion and said second end, said first and second shoulders operable to maintain a minimum gap between said first and second radially-extending flanges and prevent both said first and second flanges from concurrently contacting said plurality of projections.

8. The combination of claim 1 further comprising:
   an annular seal disposed between said plurality of projections and said free-standing ring and extending across a space defined between adjacent projections to minimize passage of a fluid through said space, wherein said annular seal includes first and second panels disposed in back-to-back relation and moveable relative to one another about said axis.

9. The combination of claim 8 wherein said free-standing ring further comprises:
   a first radially-extending flange disposed on a first side of said plurality of projections along said axis; and
   a second radially-extending flange disposed on a second side of said plurality of projections along said axis opposite said first side, wherein said first panel contacts said first radially-extending flange and said protrusion extends through said space to contact said second radially-extending flange and thereby support said first panel against deflection.

10. The combination of claim 9 wherein said rolling assembly is further defined as maintaining a circumferential alignment of said annular seal with said space.

11. The combination of claim 10 wherein said rolling assembly further comprises:
    a plurality of slots defined in one of said free-standing ring and said plurality of projections and extending in a radial direction with respect to said axis; and
    a plurality of pins each being rotatably engaged with the other of said free-standing ring and said plurality of projections and each being received in one of said plurality of slots to thereby couple said combustor liner and said free-standing ring together for said relative radial displacement, wherein at least one of said first and second panels includes an aperture aligned with one of said plurality of slots and receiving one of said plurality of pins to align said annular seal with said space.

12. The combination of claim 11 wherein said first panel includes a first aperture aligned with a first of said plurality of slots and said second panel includes a second aperture aligned with a second of said plurality of slots different than said first of said plurality of slots such that said first and second panels are circumferentially offset from one another to enhance sealing.

13. The combination of claim 11 wherein said first panel includes a first aperture aligned with and wider than one of said plurality of slots for allowing relative circumferential displacement between said first panel and said plurality of projections.

14. The combination of claim 13 wherein said second panel includes a second aperture aligned with and of equal width to one of said plurality of slots for preventing relative circumferential displacement between said second panel and said plurality of projections.

15. A gas turbine engine extending along an axis and comprising:
   an annular combustor extending along said axis and having a combustor liner;
   a plurality of projections extending from said combustor liner and spaced from one another circumferentially about said axis;
   a free-standing ring disposed about said combustor liner and positioned adjacent to said plurality of projections along said axis;
   wherein said plurality of projections engage a corresponding circumferentially-facing portion of said free-standing ring and support said combustor liner while allowing relative radial displacement between said combustor liner and said free-standing ring;
   a limiting structure operably disposed between said free-standing ring and said plurality of projections to limit said relative radial displacement to a predetermined amount of design travel;
   a plurality of slots defined in one of said free-standing ring and said plurality of projections and extending in a radial direction with respect to said axis; and
   a plurality of pins each being rotatably engaged with the other of said free-standing ring and said plurality of projections and each being received in one of said plurality of slots to thereby engage said combustor liner and said free-standing ring together for said relative radial displacement and concurrently reduce binding, wherein each of said slots extends radially-outward from a first closed end to a second closed end spaced radially outward of said first closed end for limiting said relative radial displacement.

16. An apparatus comprising:
   a gas turbine engine extending along an axis and including an annular combustor with a combustor liner;
   a plurality of projections extending from said combustor liner and spaced from one another circumferentially about said axis;
   a free-standing ring disposed about said combustor liner and positioned adjacent to said plurality of projections along said axis;
   wherein said plurality of projections engage a corresponding circumferentially-facing portion of said free-standing ring and circumferentially support said combustor liner while allowing relative radial displacement between said combustor liner and said free-standing ring; and
   a self-supporting annular seal disposed between said free-standing ring and said plurality of projections and extending radially across a space between adjacent projections to substantially prevent passage of fluid through said space, said annular seal having a variable width about said axis wherein wider portions of said annular seal are disposed between adjacent projections and narrower portions of said annular seal are aligned with said plurality of projections.

17. The apparatus of claim 16 wherein said annular seal is further comprises:
   first and second panels laid back-to-back with one another wherein said first panel is substantially flat and said second panel includes a flat portion and a protrusion extending from said flat portion away from said first panel.

18. The apparatus of claim 17 wherein each of said plurality of projections extends from a base adjacent to said combustor liner to a distal end and includes a flange projecting from said distal end parallel to said axis to capture and limit radial movement of said second panel.

19. The apparatus of claim 18 wherein said second panel defines a height in a direction radial to said axis substantially equal to a distance between said base and said flange.

20. The apparatus of claim 19 wherein said free-standing ring further comprises:
   a first radially-extending flange disposed on a first side of said plurality of projections along said axis; and
   a second radially-extending flange disposed on a second side of said plurality of projections along said axis opposite said first side, wherein said first panel contacts said first radially-extending flange and said protrusion extends through said space to contact said second radially-extending flange and thereby support said first panel.

* * * * *